United States Patent
Maas et al.

(10) Patent No.: US 9,664,805 B2
(45) Date of Patent: May 30, 2017

(54) SEISMIC CABLE HANDLING SYSTEM AND METHOD

(71) Applicant: SHELL OIL COMPANY, Houston, TX (US)

(72) Inventors: Steven James Maas, Pflugerville, TX (US); Guido Jozef Maria Baeten, Rijswijk (NL); Johan Cornelis Hornman, The Hague (NL); Grant Slack Irwin, Austin, TX (US)

(73) Assignee: SHELL OIL COMPANY, Houston, TX (US)

( * ) Notice: Subject to any disclaimer, the term of this patent is extended or adjusted under 35 U.S.C. 154(b) by 61 days.

(21) Appl. No.: 14/383,224

(22) PCT Filed: Mar. 5, 2013

(86) PCT No.: PCT/US2013/029002
§ 371 (c)(1),
(2) Date: Sep. 5, 2014

(87) PCT Pub. No.: WO2013/134196
PCT Pub. Date: Sep. 12, 2013

(65) Prior Publication Data
US 2015/0041580 A1 Feb. 12, 2015

Related U.S. Application Data

(60) Provisional application No. 61/608,357, filed on Mar. 8, 2012.

(51) Int. Cl.
*G01V 1/16* (2006.01)
*G01V 1/20* (2006.01)

(52) U.S. Cl.
CPC .............. *G01V 1/168* (2013.01); *G01V 1/20* (2013.01)

(58) Field of Classification Search
CPC ............ G01V 1/16; G01V 1/20; G01V 1/168
See application file for complete search history.

(56) References Cited

U.S. PATENT DOCUMENTS

| 4,091,946 A | 5/1978 | Kraeft et al. |
| 4,103,501 A | 8/1978 | Laurent |

(Continued)

FOREIGN PATENT DOCUMENTS

| EP | 1705489 | 9/2006 |
| EP | 1847850 | 10/2007 |

(Continued)

OTHER PUBLICATIONS

Maas et al., "Optical sensor and accelerometer revolution for seismic monitoring and acquisition," AESC, Melbourne, Australia, 2006.

(Continued)

*Primary Examiner* — Sang Kim (57) ABSTRACT

A system and method for handling seismic cable having sensor stations thereon is provided. The seismic cable is positionable about the seismic field for measuring seismic parameters of a subsurface structure. The system includes a mobile unit, a reel and a winch assembly. The mobile unit is positionable about the seismic field, and has a platform. The reel is supportable on the platform with the seismic cable disposable about the reel. The winch assembly is carried by the mobile unit and includes a plurality of cable guides. At least one of the cable guides has a passageway with an adjustable dimension for aligning and guiding the seismic cable and the sensor stations passing therethrough.

24 Claims, 12 Drawing Sheets (56) References Cited

U.S. PATENT DOCUMENTS

| | | | |
|---|---|---|---|
| 4,372,420 A * | 2/1983 | White | G01V 1/047 |
| | | | 181/110 |
| 4,384,808 A | 5/1983 | Yamamura et al. | |
| 4,458,341 A | 7/1984 | Goebel | |
| 4,525,818 A | 6/1985 | Cielo et al. | |
| 4,648,083 A | 3/1987 | Giallorenzi | |
| 5,314,047 A | 5/1994 | Nielsen | |
| 5,624,207 A | 4/1997 | Berges | |
| 6,002,640 A | 12/1999 | Harmon | |
| 6,260,656 B1 | 7/2001 | Orban et al. | |
| 6,549,488 B2 | 4/2003 | Maas et al. | |
| 6,588,980 B2 | 7/2003 | Worman et al. | |
| 6,606,186 B2 | 8/2003 | Maas | |
| 6,631,095 B1 | 10/2003 | Bryant et al. | |
| 6,775,204 B2 | 8/2004 | Scott | |
| 6,827,597 B1 | 12/2004 | Metzbower et al. | |
| 6,850,461 B2 | 2/2005 | Maas et al. | |
| 6,970,396 B2 | 11/2005 | Maas et al. | |
| 6,982,925 B2 | 1/2006 | Maas et al. | |
| 6,988,854 B2 | 1/2006 | Porter | |
| 7,142,481 B1 | 11/2006 | Metzbower et al. | |
| 7,154,082 B2 | 12/2006 | Maas | |
| 7,222,534 B2 | 5/2007 | Maas et al. | |
| 7,349,591 B2 | 3/2008 | Maas | |
| 7,380,742 B2 | 6/2008 | Stevens | |
| 7,613,071 B2 | 11/2009 | Iseli et al. | |
| 7,622,706 B2 | 11/2009 | Maas | |
| 7,660,203 B2 | 2/2010 | Barakat et al. | |
| 8,035,393 B2 | 10/2011 | Tenghamn et al. | |
| 8,075,223 B2 | 12/2011 | Ansay et al. | |
| 2003/0011843 A1 | 1/2003 | Maas | |
| 2003/0011878 A1 | 1/2003 | Maas | |
| 2003/0057769 A1 | 3/2003 | Scott | |
| 2004/0037165 A1 | 2/2004 | Lemenager et al. | |
| 2004/0257913 A1 | 12/2004 | Ray et al. | |
| 2005/0033519 A1 | 2/2005 | Fenton | |
| 2005/0047275 A1 | 3/2005 | Chamberlain et al. | |
| 2005/0098377 A1 | 5/2005 | Bary et al. | |
| 2005/0122838 A1 | 6/2005 | Maas et al. | |
| 2005/0174887 A1 | 8/2005 | Nash et al. | |
| 2008/0018475 A1 | 1/2008 | Breed et al. | |
| 2008/0062815 A1 | 3/2008 | Iseli | |
| 2008/0080310 A1 | 4/2008 | Eperjesi et al. | |
| 2008/0080311 A1 | 4/2008 | Eperjesi et al. | |
| 2008/0192570 A1 | 8/2008 | Lennart et al. | |
| 2008/0238038 A1 | 10/2008 | Anderson et al. | |
| 2008/0272888 A1 | 11/2008 | Cardwell et al. | |
| 2009/0185170 A1 | 7/2009 | Maas | |
| 2009/0225629 A1 | 9/2009 | Ray | |
| 2010/0074054 A1 | 3/2010 | Barakat et al. | |
| 2010/0157727 A1 | 6/2010 | Woodard et al. | |
| 2011/0005801 A1 | 1/2011 | Olivier et al. | |
| 2011/0140692 A1 | 6/2011 | Classen et al. | |
| 2011/0222374 A1 | 9/2011 | Berg et al. | |
| 2011/0286303 A1 | 11/2011 | Paull et al. | |
| 2001/0305114 | 12/2011 | Golparian et al. | |
| 2011/0310704 A1 | 12/2011 | Ray et al. | |

FOREIGN PATENT DOCUMENTS

| | | |
|---|---|---|
| GB | 2467069 | 9/2010 |
| WO | 2010105177 | 9/2010 |

OTHER PUBLICATIONS

Tech Link: A Publication of Petroleum Geo-Services, "Fiber Optic Seismic Technology," vol. 6, No. 8, Jul. 2006.

PCT International Search Report, Application No. PCT/US2013/028997 dated May 13, 2013.

PCT International Search Report, Application No. PCT/US2013/029002 dated May 13, 2013.

PCT International Search Report, Application No. PCT/US2013/029009 dated May 10, 2013.

* cited by examiner

SEISMIC CABLE HANDLING SYSTEM AND METHOD

PRIORITY CLAIM

The present application is a National Stage (§371) application of PCT/US2013/029002, filed Mar. 5, 2013, which claims the benefit of U.S. Provisional Application No. 61/608,357, filed Mar. 8, 2012, both of which are incorporated herein by reference.

BACKGROUND

The present disclosure relates generally to techniques for performing seismic operations about a subsurface structure. More specifically, the present invention relates to cable handling systems for deploying and/or retrieving seismic cable.

The exploration of oil and gas may involve the investigation of subsurface structures, such as geological formations and/or reservoirs. Seismic sensing systems may be positioned about a surface location for sensing properties of the subsurface structures. Such properties may include physical properties, such as pressure, motion, energy, etc. Such properties may occur naturally, or may be generated by imparting a force to the surface using a seismic energy source (e.g., a seismic vibration truck). The reflected seismic waves generated by the seismic energy source may be collected and analyzed to determine characteristics of the subsurface structures.

Techniques have been developed for sensing seismic parameters. Some techniques involve placing cable about a surface location near the subsurface structures of interest. Examples of such techniques are provided in US Patent/Application Nos. 20080062815, 20080060310, and 20080060311. The cable used in seismic operations may include sensors, such as optical sensors, geophone sensors and electronic modules, attached at intermittent points along a length of the cable. The sensors may have remote electronic monitoring packages that are linked to cables that carry each sensor's output signals back to a seismic recording system.

Some seismic sensing systems may be, for example, optical systems including seismic trucks distributed about a location for independently collecting seismic data. Each seismic truck may have fiber optic cables with optical sensors distributed about a surface location of a subsurface structure. The seismic trucks may also have a light source for emitting a laser through the fiber optic cables. The light source distributes light to and collects light from the optical sensors positioned along the fiber optic cables. The seismic truck may have devices for detecting changes in the light. Such changes may be used to determine information about and generate images of the subsurface structures. Examples of optical systems and sensors are provided in U.S. Pat. Nos. 7,622,706, 7,222,534, 7,154,082, and 6,549,488.

Seismic exploration of oil and gas reservoirs underlying land areas may require the laying and retrieval of lengths of seismic line cable. The cable may be carried to a given location and manually unwound from the reel for use. The cable may also be distributed using devices, such as the system described in U.S. Pat. No. 6,775,204. In applications involving the use of fiber optic cable, the optical sensors may be deployed with the cables. In some cases, the optical sensors may interfere with the devices used in distributing the cable or may be damaged during distribution. Thus, there remains a need to provide advanced techniques for deploying and retrieving seismic cable.

SUMMARY

The present disclosure relates to a system for handling seismic cable having sensor stations thereon. The seismic cable is positionable about the seismic field for measuring seismic parameters of a subsurface structure. The system includes a mobile unit, a reel and a winch assembly. The mobile unit is positionable about the seismic field, and has a platform. The reel is supportable on the platform, with the seismic cable disposable about the reel. The winch assembly is carried by the mobile unit and includes a plurality of cable guides. At least one of the cable guides has a passageway with an adjustable dimension for aligning and guiding the seismic cable and the sensor stations passing therethrough.

The cable guides include at least one accumulator guide sheave, tensioner, and/or static guide. The accumulator guide sheave includes an accumulator roller and a movable accumulator guide. The plurality of cable guides includes at least one tensioner. The tensioner includes a top plate and a pair of movable bottom plates with a pair of rollers therebetween. The static guide includes a ring positionable adjacent a surface of the seismic field.

The system may also include a radio frequency identification unit. The radio frequency identification unit includes an antenna and a radio frequency identification sensor. The radio frequency identification sensor detects radio frequency identification tags on the sensor stations. The system may also include a reel support comprising a level wind and guide rails, a storage reel, a crane carried by the mobile unit, a motor operatively connectable to the reel (the motor rotationally driving the reel), electronics, and at least one guide sensor. The mobile unit includes a truck.

The disclosure also relates to a method for deploying seismic cable about a seismic field. The method involves providing a mobile unit, a reel, and a winch assembly. The mobile unit has a platform. The seismic cable is disposable about the reel. The winch assembly includes a plurality of cable guides. At least one of the plurality of cable guides has a passageway with an adjustable dimension. The method further involves positioning the mobile unit about the seismic field, supporting the reel on the platform, and passing the seismic cable and the sensor stations through the guides in an aligned and guided position.

The method may also involve deploying the seismic cable and the sensor stations about the seismic field, retrieving the seismic cable and the sensor stations from the seismic field, disposing the seismic cable about the reel, selectively applying tension to the seismic cable, loading the reel onto the platform, scanning radio frequency identification tags on the sensor stations, collecting subsurface data from the sensor stations, correlating information from the sensed radio frequency identification tags with the subsurface data collected by the sensor stations, determining a location of each of the sensor stations from global positioning satellite data, and/or burying the cable and sensor stations in the earth.

BRIEF DESCRIPTION OF THE DRAWINGS

A more particular description of the subject matter, briefly summarized herein, may be had by reference to the embodiments thereof that are illustrated in the appended drawings. The figures are not necessarily to scale, and certain features and certain views of the figures may be shown exaggerated in scale or in schematic in the interest of clarity and conciseness.

FIGS. 1.1-1.4 depict various schematic views of a system for handling seismic cable, the system including a mobile unit, a reel and a winch assembly.

FIGS. 2.1-2.4 depict various schematic views of components of a system for handling seismic cable.

FIGS. 3.1-3.6 depict various schematic views of an accumulator guide sheave for guiding a seismic cable.

FIGS. 4.1-4.8 depict various schematic views of a tensioner for guiding a seismic cable.

DETAILED DESCRIPTION

The description that follows includes exemplary apparatuses, methods, techniques, and instruction sequences that embody techniques of the inventive subject matter. However, it is understood that the described embodiments may be practiced without these specific details.

Systems and methods for handling seismic cable are provided. The seismic cable (and sensor stations on the seismic cable) may be carried on reels that are mounted onto a mobile unit. The mobile unit may be driven about the location to deploy and/or retrieve cable. Deployment of cable may be performed, for example, at a rate of about 10 km/hr. The mobile unit has a winch assembly that guides the cable as it is deployed and/or retrieved from the reel. The winch system includes cable guides with adjustable passageways for guiding and aligning the seismic cable and sensor as it passes therethrough. The system may also have a radio frequency identification (RFID) unit for sensing RFID tags of the sensor stations.

FIGS. 1.1-1.4 depict plan, top, rear and perspective views, respectively, of a system 100 for handling seismic cable 102. FIGS. 2.1-2.4 depict top, plan, perspective and rear assembly views, respectively, of various portions of the system 100. The cable 102 used with the system 100 may have sensor stations 103 thereon. When referenced herein, the cable 102 will also refer to the cable 106 with sensor stations 103 thereon.

The system 100 includes a mobile unit 104, a reel 106 and a winch assembly 108. The mobile unit 104 has a platform 110 for supporting the reel 106. The mobile unit 104 and platform 110 are depicted as a truck with a truck bed for holding the reel 106, but any transportable device (e.g., a cart, trailer, vehicle, etc.) positionable about a seismic field 111 may be used. A seismic field 111 may be any surface location from which the system may be positioned for collecting seismic data from a subsurface structure.

The reel 106 may be positioned on the platform using a crane 112. The crane 112 is supported on the platform 110 of the mobile unit 104. The crane 112 may be separate from the mobile unit 104, or the reel 106. The reel 106 may be loaded manually or automatically, by hand or with a device, such as crane 112. The platform 110 may have a lift 114 that may be raised and lowered to facilitate loading and/or access to the platform 110.

Figure 21:
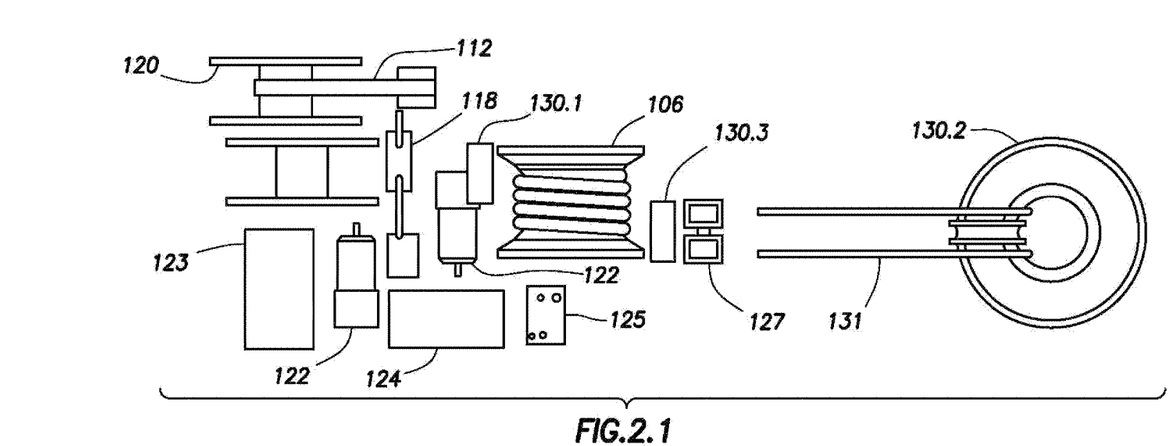
Figure 22:
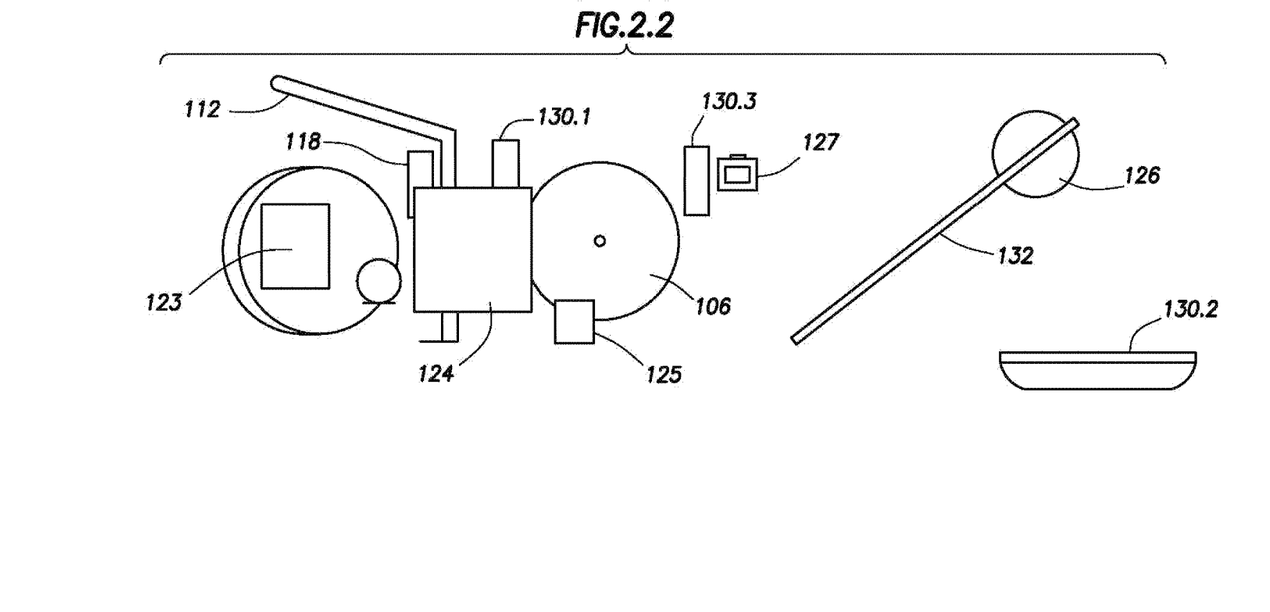
Figure 23:
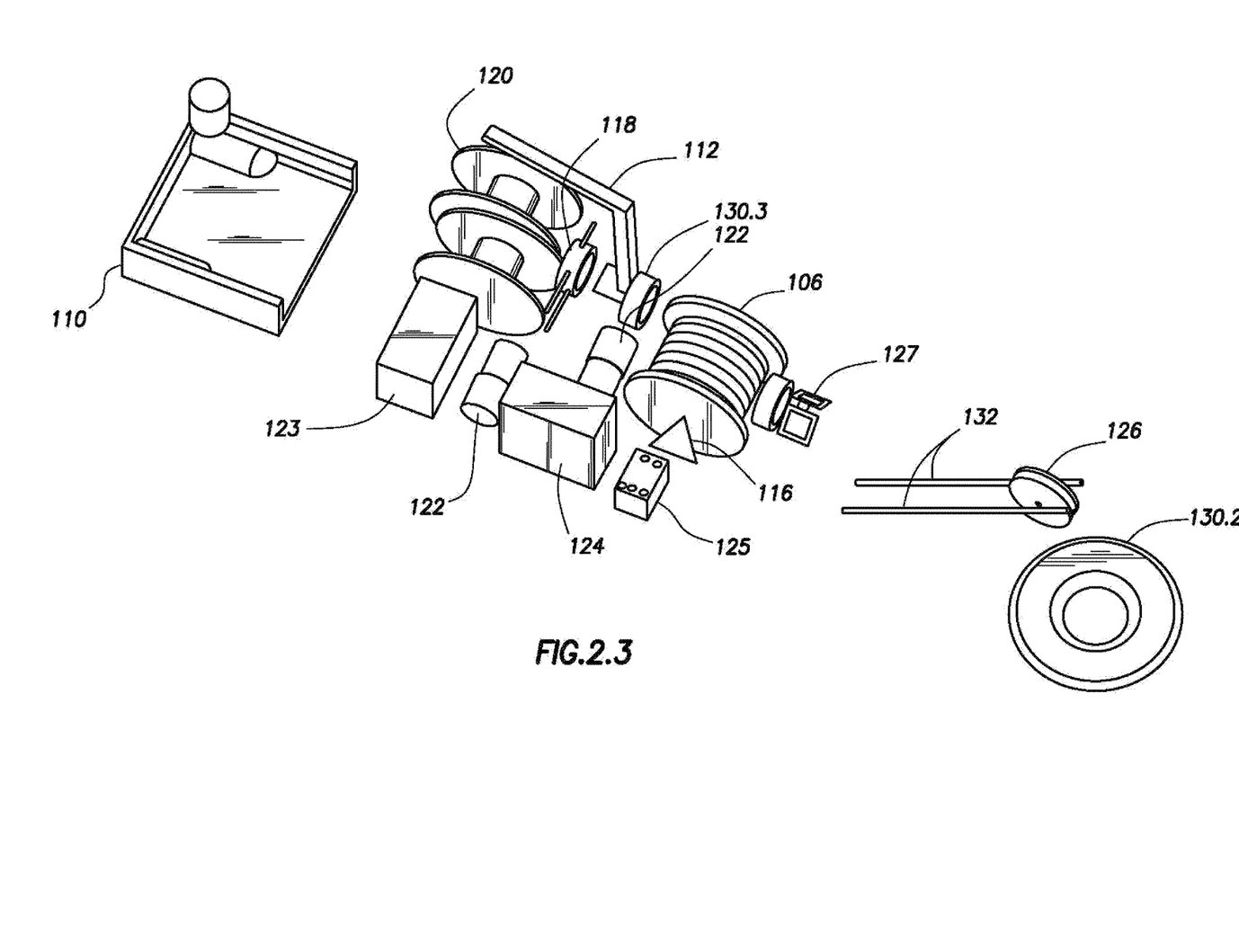
Figure 24:
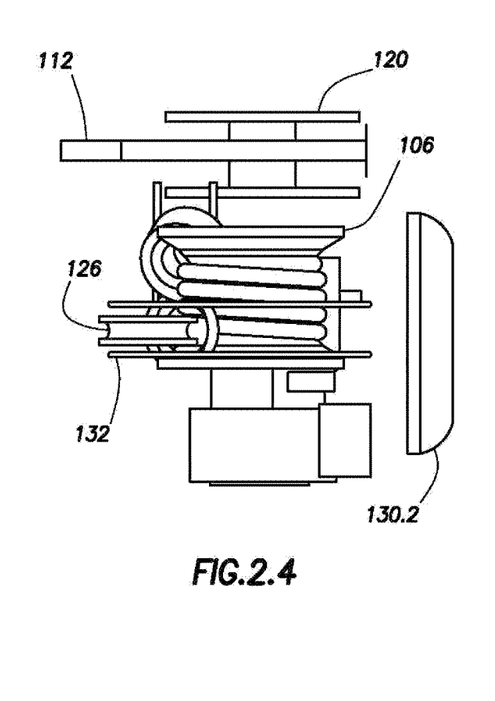
Figure 31:
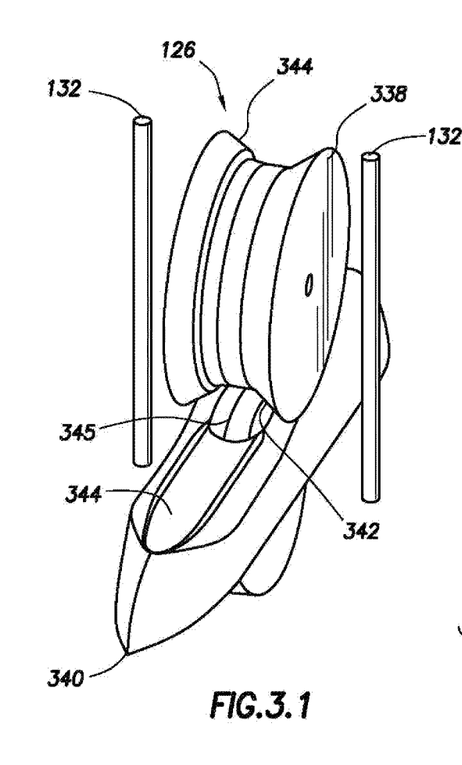
Figure 32:
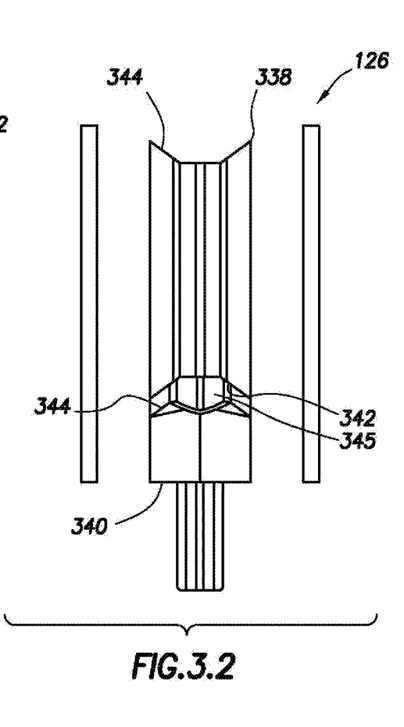
Figure 33:
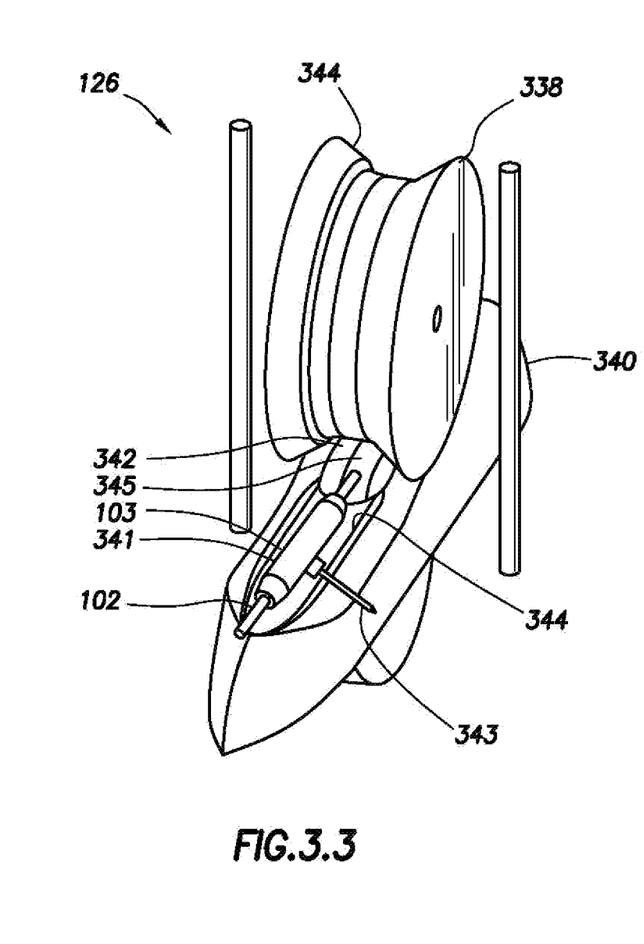
Figure 34:
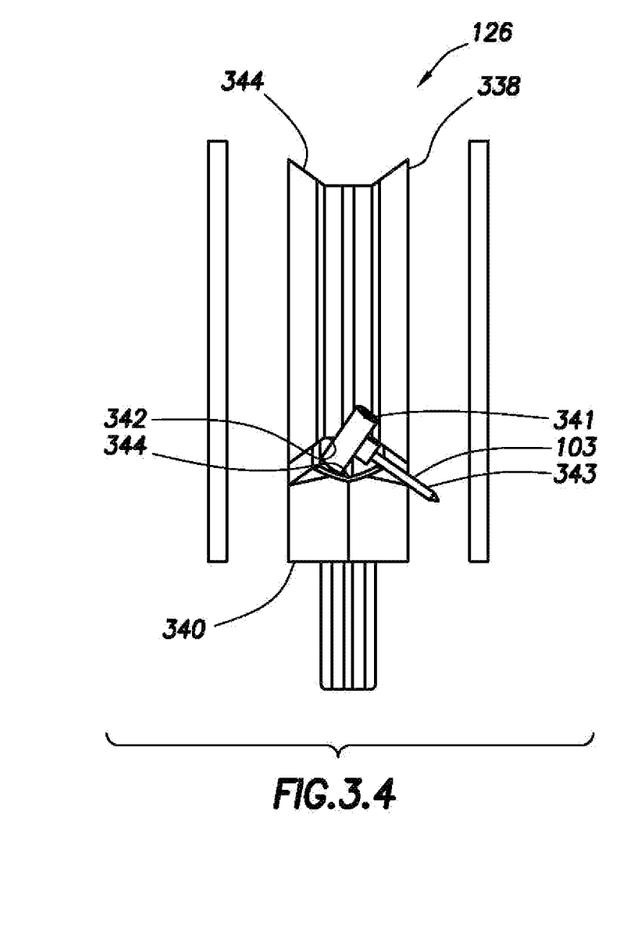

The reel 106 may be connectable to the platform 110 by a reel support 116. The reel support 116 may have a level wind 118 for positioning and guiding the reel 106 during operation. Additional reels, such as a storage reel 120 (see, e.g., FIG. 2.1), may also be provided for carrying additional seismic cable (e.g., to be distributed) or for storing seismic cable (e.g., retrieved from the seismic field).

Motors 122 may be provided for rotationally driving the reel 106. A generator 123 (e.g., diesel or electric) may be used for powering the system 100. Fuel tanks 125 may be provided for fueling the generator 123. The operation may be manually or automatically driven. Electronics 124 may be provided for operating the system 100. An RFID unit 127 may also be provided as will be described further herein.

The reel 106 carries the seismic cable 102 for deployment and/or retrieval about the seismic field 111. The seismic cable 102 extends from the reel 106 and through the winch assembly 108. The winch assembly 108 includes an accumulator guide sheave 126, a tensioner 128, and static guides 130.1, 130.2, 130.3. The accumulator guide sheave 126 is supported about the reel 106 by accumulator guides 132. The level wind 118 is positioned between the accumulator guide sheave 126 and the reel 106 for guiding the cable 102 therebetween.

The static guide 130.1, the tensioner 128 and the static guides 130.2 are positioned between the accumulator guide sheave 126 and the seismic field 111. The cable 102 extends between the accumulator guide sheave 126, through the static guide 130.1, the tensioner 128 and the static guides 130.2, and to the seismic field 111. The cable 102 extends through the static guides 130.1-130.3 and is guided thereby. The static guides 130.1 and 130.2 are depicted as rings with holes sized for passage of the cable 102 therethrough. The cable 102 also extends through the tensioner 128 to receive tension therefrom. One or more guides, tensioners, sheaves and/or other cable control devices may be provided. The electronics 124 may be used to automatically or manually manipulate tension in response to sensed conditions and/or as desired. Sensors S may be positioned about the system 100 to detect conditions, such as tension, that may be used by the electronics to control the movement of the cable 102.

The static guide 130.2 is positioned near the ground for facilitating manipulation of the cable 102. The static guide 130.2 is supported by an arm 131 connectable to the mobile unit 104. The static guide 103.2 may be positioned at a desired angle, depth and distance from the mobile unit 104 and the earth to place and retrieve the cable 102. As shown, the static guide 103.2 is a ring positioned horizontal to the earth and has a hole therethrough sized to pass the cable 102 therethrough to a desired position and/or location. Tension of the cable 102 may also be adjusted to further facilitate placement of the cable 102 and/or sensor stations 103.

The accumulator guide sheave 126 is shown in greater detail in FIGS. 3.1-3.6. These figures show various views of the accumulator guide sheave 126 with the cable 102 passing therethrough. For clarity, only a portion of the cable 102 is depicted along with the sensor station 103. Also for clarity, the accumulator guide sheave 126 is shown separated from the accumulator guides 132. As shown in FIGS. 3.1 and 3.2, the accumulator guide sheave 126 includes a sheave wheel 338 and a sheave guide 340 with a passageway 342 defined therebetween. As shown in FIGS. 3.3 and 3.4, the cable 102 passes through the passageway 342. The sheave wheel 338 and sheave guide 340 each have guide channels 344 thereon for aligning the cable 102 as it passes therebetween. A body 341 of the sensor station 103 may pass along the guide channels 344. The sheave guide 340 is curved and outwardly angled to slidingly receive a spike 343 of the sensor station 103 to assist in positioning the sensor station 103 as it passes. The sensor station 103 may be positioned to pass along the sheave guide 340 at about a horizontal angle (e.g., about 180 degrees) as it approaches the sheave wheel 338.

Figure 35:
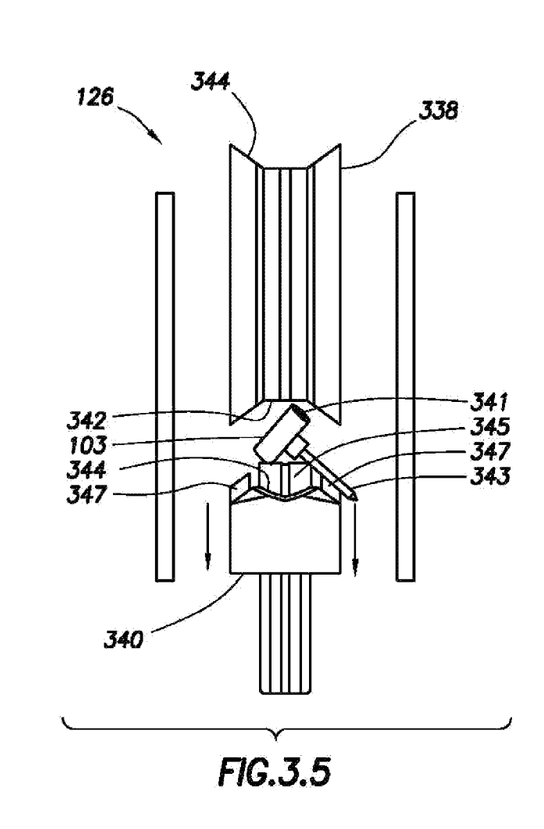
Figure 36:
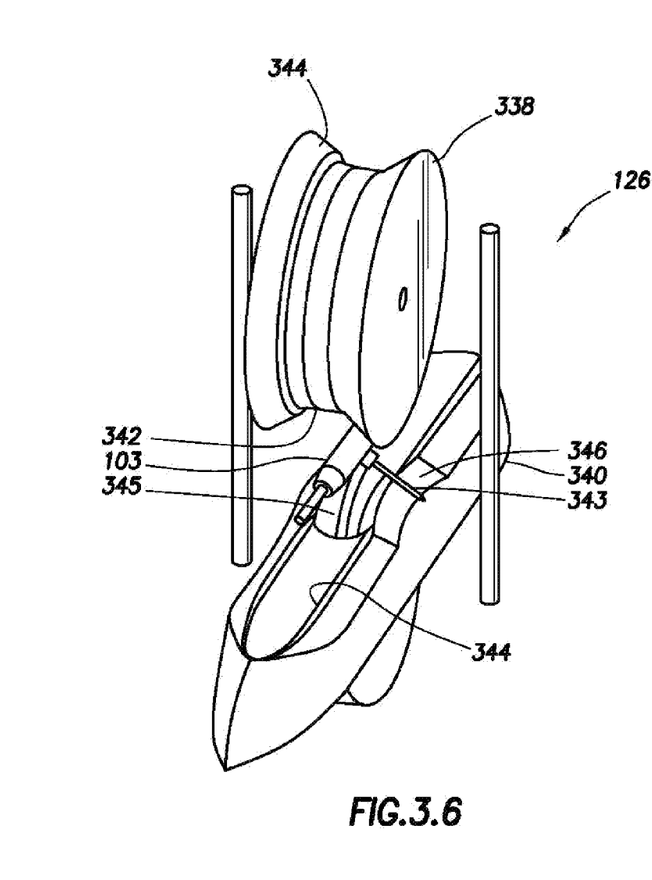
Figure 41:
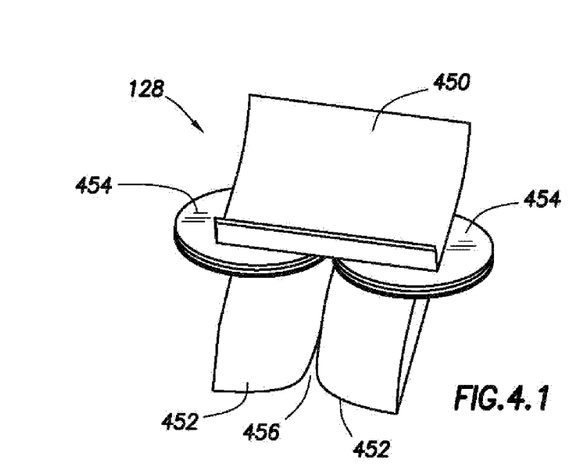
Figures 42, 44:
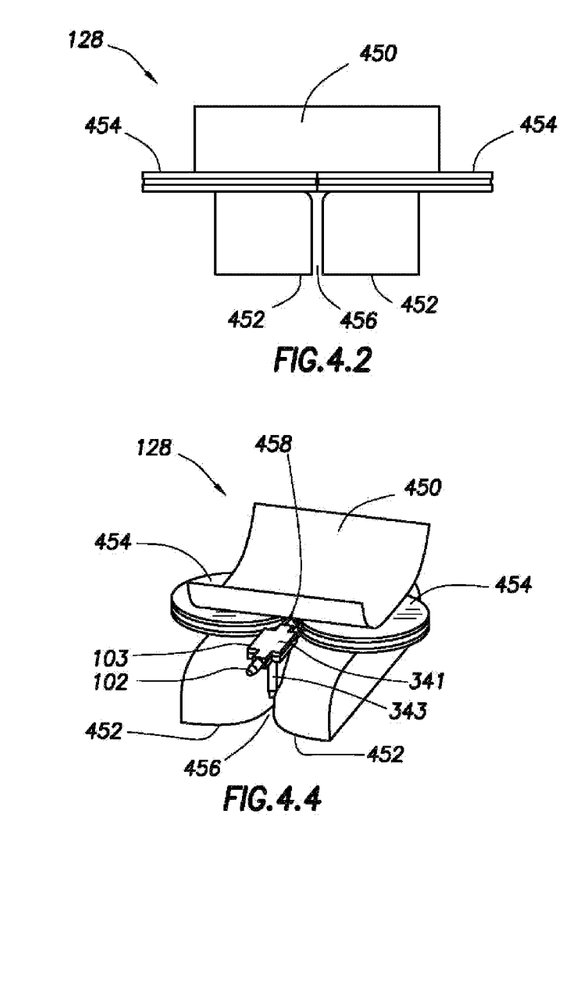
Figure 43:
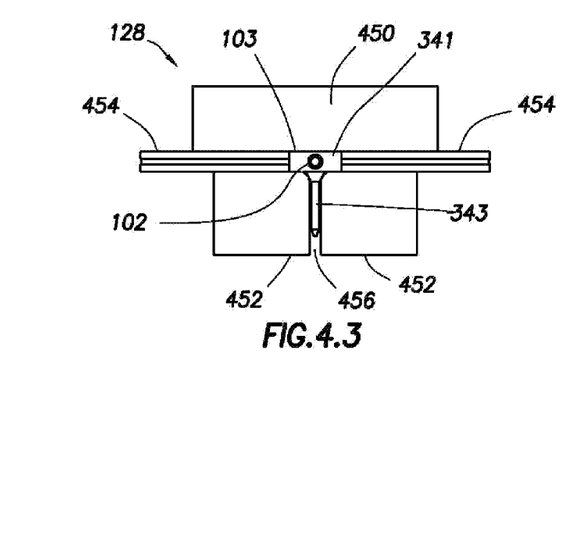
Figure 45:
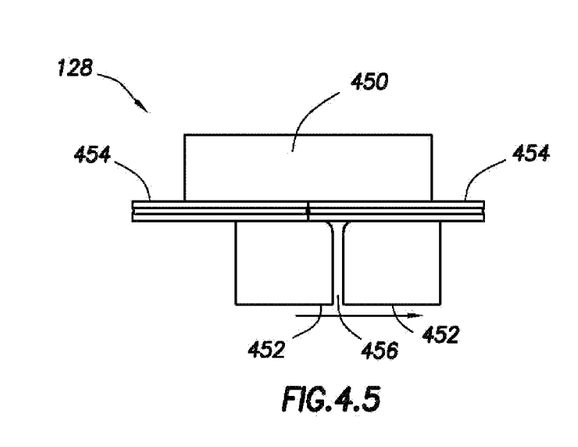
Figure 46:
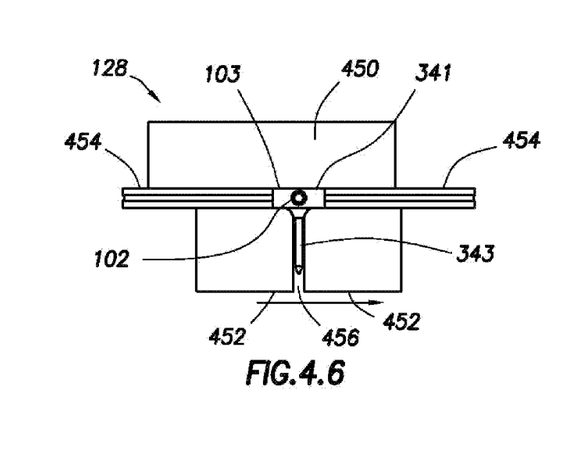
Figure 47:
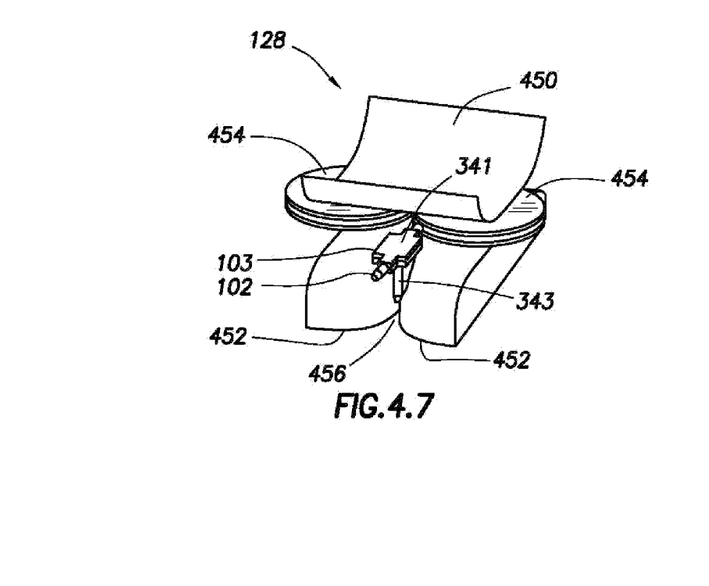
Figure 48:
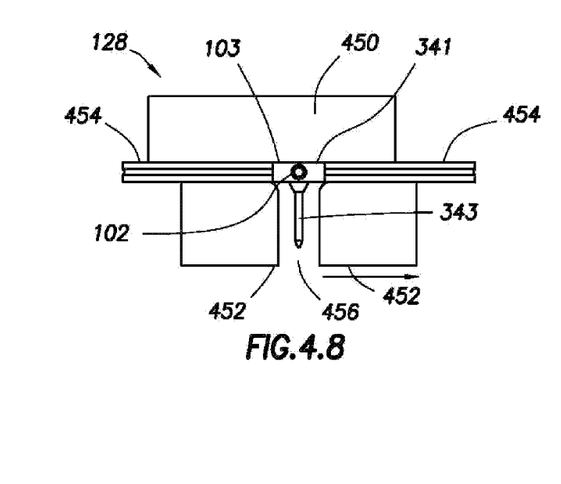

FIGS. 3.5 and 3.6 show the sensor station 103 as it passes between the sheave wheel 338 and the sheave guide 340. The sheave wheel 338 and/or the sheave guide 340 may optionally extend and retract as the cable 102 passes therethrough. The additional space may facilitate passage of the sensor station 103 to prevent damage thereto. The sheave guide 340 has a depression 347 therein for facilitating passage of the sensor station 103 through the passageway 342. A roller 345 may be provided to further facilitate passage of the sensor station 103 along the sheave guide 340. As shown, the roller 345 is in a raised position along the guide channel 344 between raised portions 347 of the sheave guide 340.

The tensioner 128 is shown in greater detail in FIGS. 4.1-4.8. These figures show various views of the tensioner 128 with the cable 102 passing therethrough. As shown in these figures, the tensioner 128 includes a tension plate 450, tension guides 452 and tension rollers 454 with a passageway 456 therebetween. The tension rollers 454 are attached to the tension guides 452, and sandwiched between the tension plate 450 and the tension guides 452.

The tension guides 452 each rotationally support one of the tension rollers 454. The tension rollers 454 have guide channels 458 thereon for guiding the sensor station 103 as it passes therebetween. A portion of the passageway 456 is defined between the tension rollers 454 for guiding the cable 102 and a body 460 of the sensor station 103 therethrough. Another portion of the passageway 456 is defined between the tension guides 452 for guiding a spike 343 extending from the body 460 of the sensor station 103. The tension guides 452 each have curved surfaces defining a portion of the passageway 456 therebetween for passing the spike 462 of the sensor station 103 therethrough.

As shown in FIGS. 4.4, 4.7 and 4.8, the cable 102 passes through the passageway 456. The sensor station 103 may be positioned to pass between the tension guides 452 at about a vertical angle (e.g., about 90 degrees) as it approaches the tensioner 128. The tension rollers 454 and/or the tension guides 452 may optionally extend and retract as the cable 102 passes therethrough. As shown in FIGS. 4.5-4.8, the tension roller 454 and the tension guide 452 may shift to facilitate alignment and/or movement of the sensor station 103 therethrough. In FIGS. 4.5-4.7, the tension guides 452 are depicted as shifting to the right relative to the tension plate 450. In FIG. 4.8, the tension guide 452 on the right side has been displaced to the right as indicated by the arrows to expand the passageway 456. The additional space may permit passage of the sensor station 103 without damage thereto. One or more tension rollers 454 and/or tension guides 452 may optionally be movable as desired.

The accumulator guide sheave 126 and the tensioner 128 provide mechanisms for guiding the cable 102 as it passes through the winch assembly 108. These mechanisms are configured to align, protect and guide sensor stations 103 on the cable 102 as the cable 102 is deployed and/or retrieved. These mechanisms may also be used to facilitate positioning of the sensor stations 103 in the proper orientation for implantation into the earth. Once in position, the sensor stations 103 may be inserted into the ground. The spike 462 of the sensor stations 103 may be inserted in the ground in a vertical orientation for sensing. Once the cable 102 is in place, a seismic source, such as a conventional base station or seismic truck connected to the cable 102, may be activated to perform seismic sensing using conventional techniques.

Referring back to FIGS. 1.1-1.4, the system 100 may be linked to a seismic station 101 for operative communication therewith. The seismic station 101 may be, for example, a seismic truck or base station with a light source for passing light through the cable 102, a detector for receiving data from the sensor stations 103, and an RFID receiver for collecting RFID data about each of the sensor stations 103. Processors and other computing devices may also be provided. The RFID receiver may be in communication with the sensor stations 103 and/or the RFID unit 127 for receiving data therefrom and/or analyzing such data.

The RFID unit 127 may be provided with an RFID antenna for identifying the RFID tags on the cable 102 and/or sensor stations 103. The RFID unit 127 may also have an RFID sensor for receiving data from and logging the sensor stations 103 as they pass thereby. This information may be used with the data collected by the seismic cable 102 and/or sensor stations 103 to, for example, correlate seismic data with location and/or sensor information specific to the identified sensor station 103. The seismic station 101 may have processors to provide such correlations.

As each sensor station 103 is deployed from the system 100, the sensor station 103 passes though the RFID unit 127 where it is identified and its location noted. The mobile unit 104 may pass along a pre-plotted line and follow the path using a global positioning satellite (GPS) tracker 133. Information concerning location of each sensor may be determined using conventional GPS technology linked to an output from each sensor station 103. The GPS data may provide position data in a three dimensional axis. Z-axis data may provide elevation information so that the sensor stations may be corrected to a similar flat datum. X-axis and Y-axis data may position data so that digital filters can be provided to remove additional error. The gathered GPS data for each sensor station may be correlated with the data collected by the sensor station for further analysis. The analyzed information may be used to determine subsurface properties at a given location.

In some cases, long uninterrupted lengths of cable 102 can be stored in storage spools 120 for use. The long cables can be deployed and identified through the RFID Unit 127 as the mobile unit drives across the seismic field 111. In some cases, crews may be used to stake the ground for cable deployment. Since channels of the sensor stations 103 are being identified and located as they exit the system 100, the RFID Unit 127 can be used to identify the locations of the sensor stations 103. The seismic station 101 may collect, store and manipulate such information.

Figure 5:
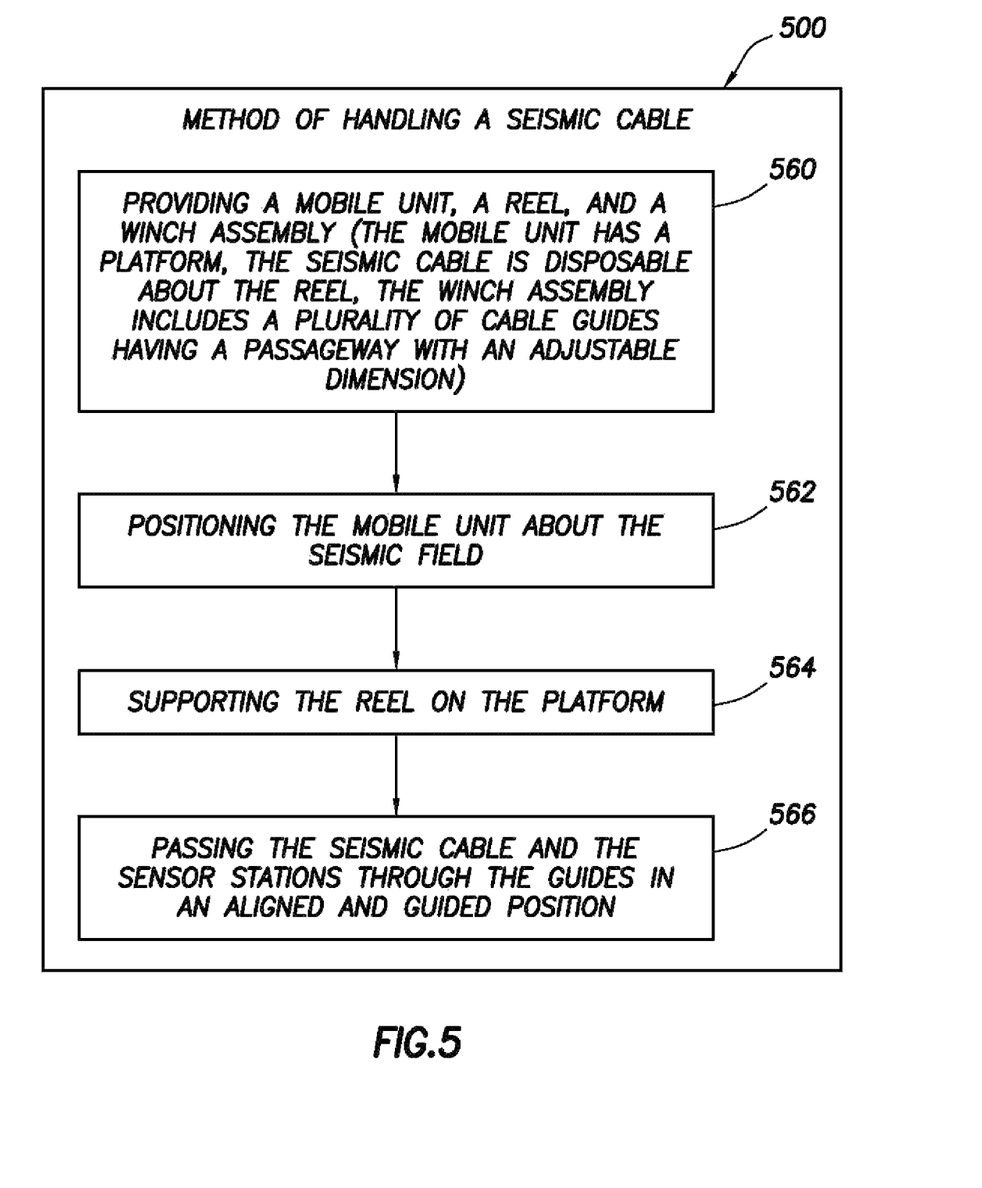
FIG. 5 is a flow chart depicting a method of handling seismic cable.
Figure 11:
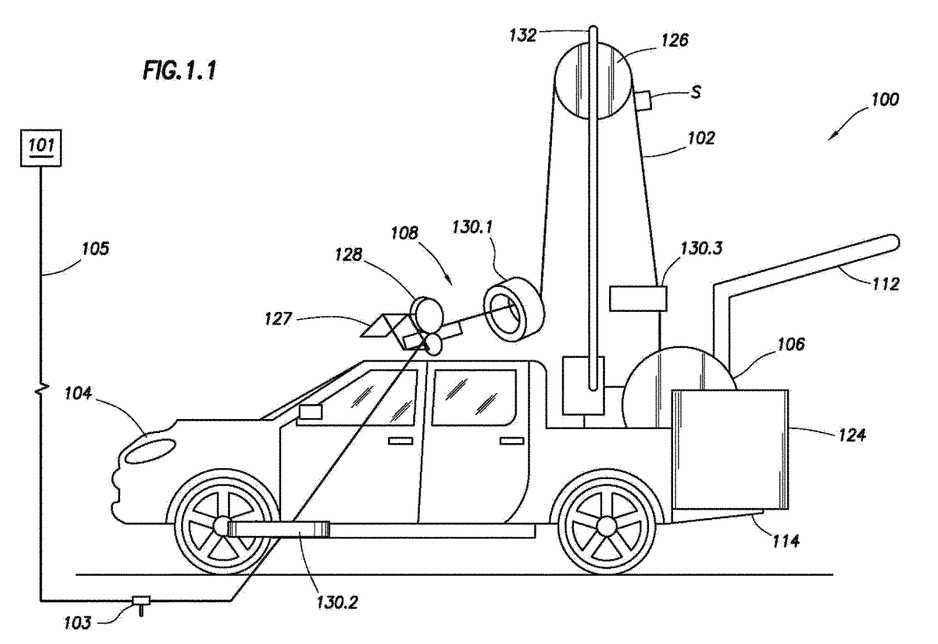
Figure 12:
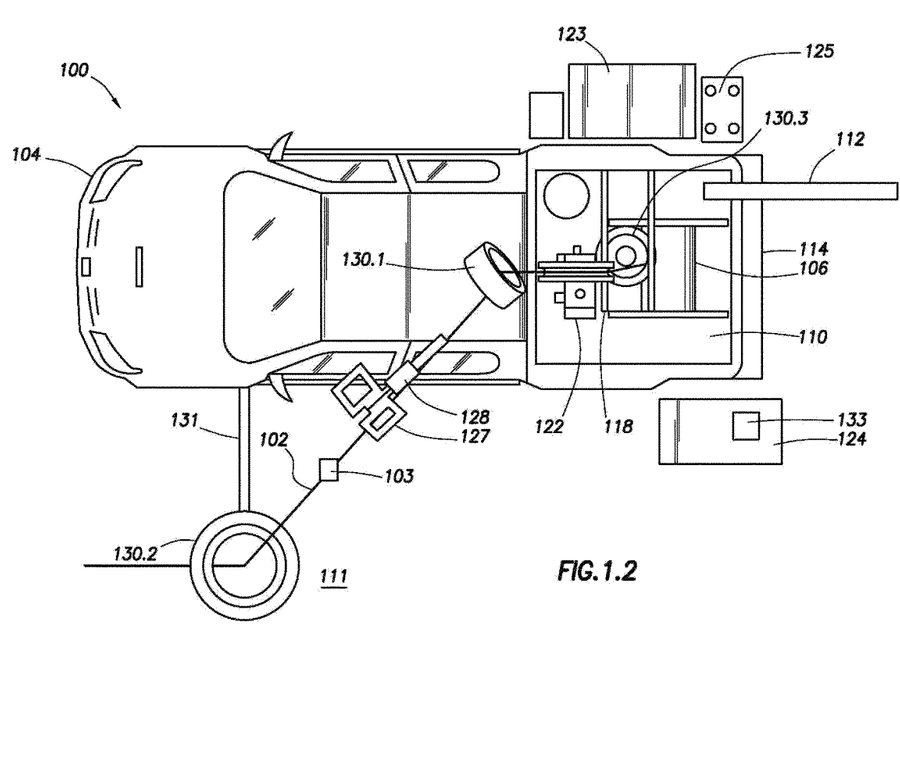
Figure 13:
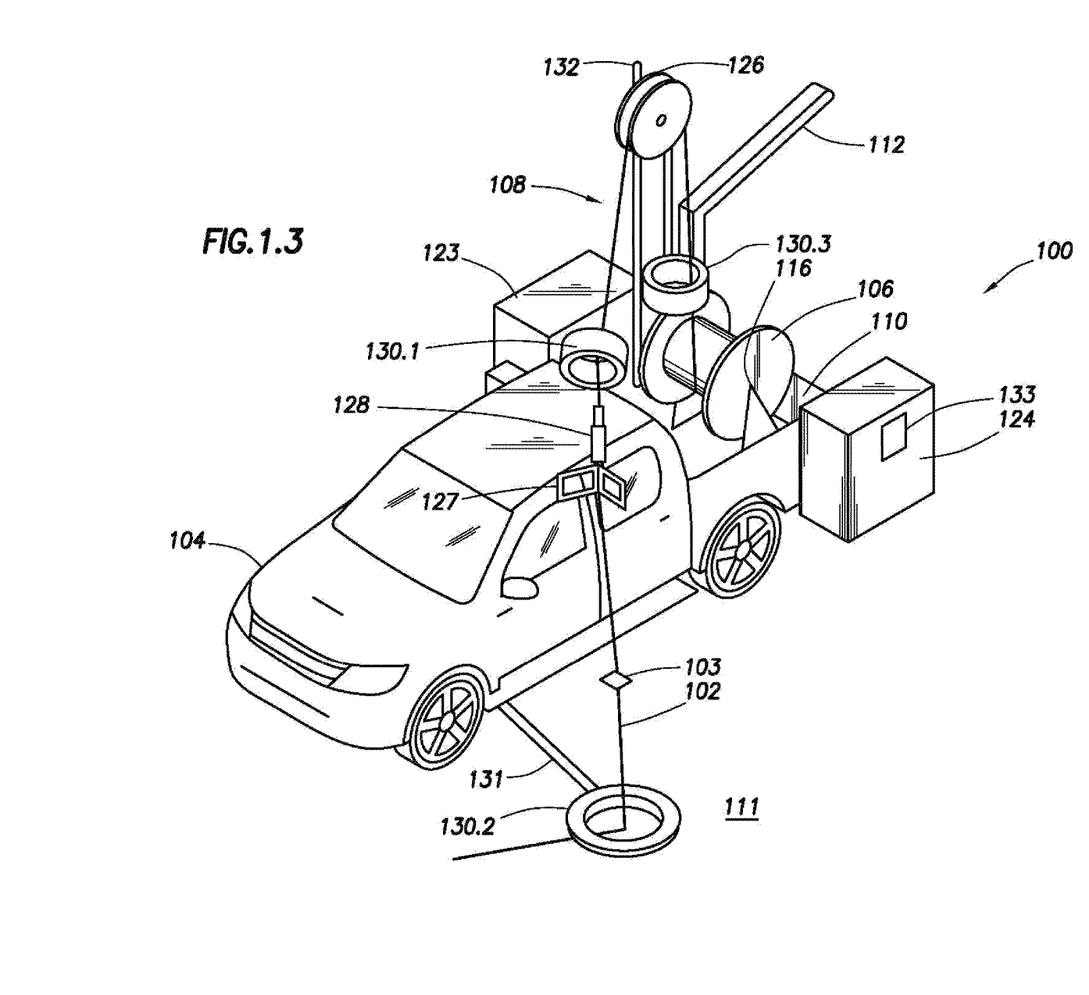
Figure 14:
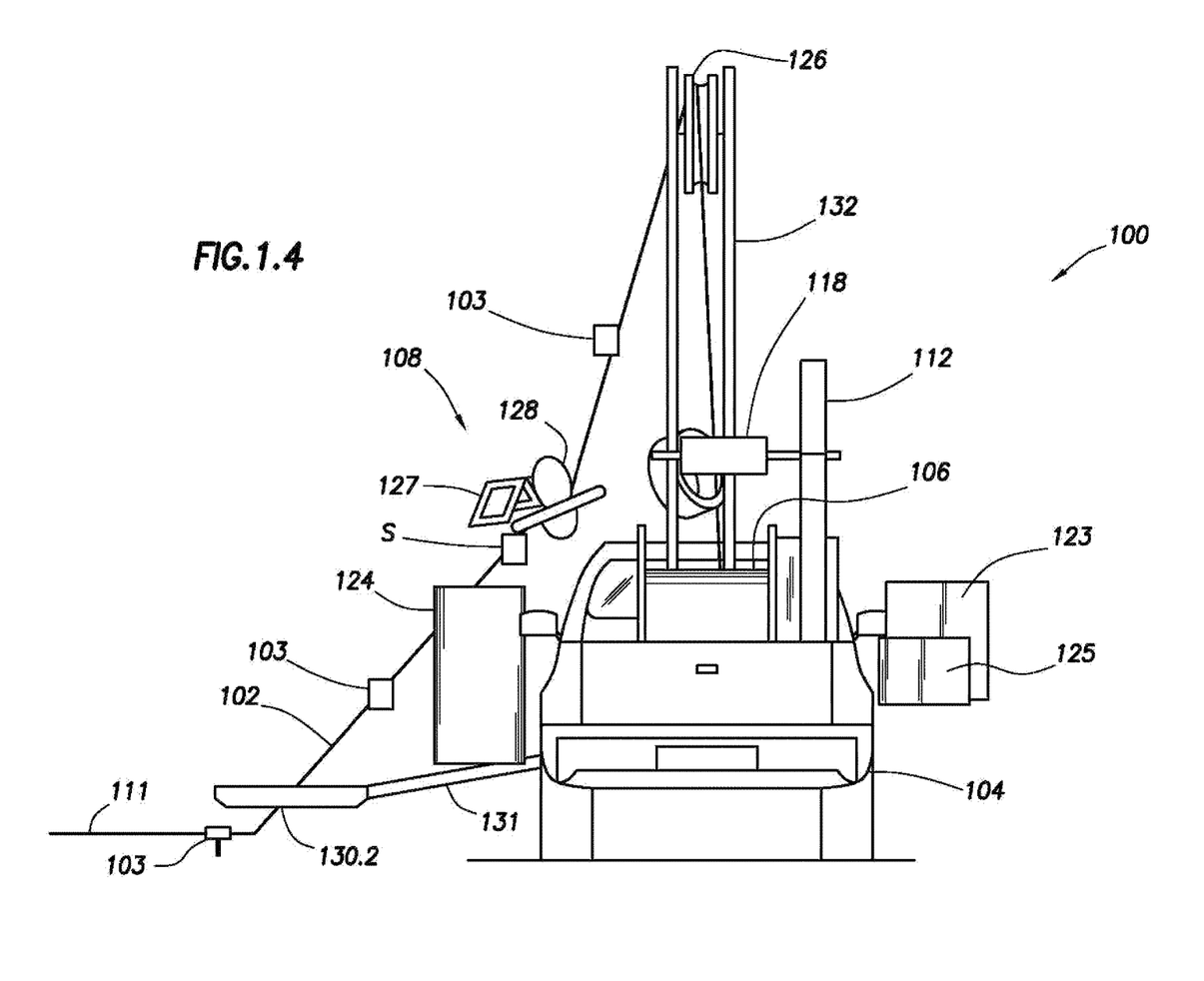

FIG. 5 is a flowchart depicting a method 500 of handling seismic cable 102 used in sensing seismic parameters of a subsurface structure. The method 500 involves providing (560) a mobile unit, a winch assembly and a reel as described herein (see, e.g., FIGS. 1.1-4.11). The method further involves positioning (562) the mobile unit about the seismic field, supporting (564) the reel on the platform, and passing (566) the seismic cable and the sensor stations through the plurality of guides in an aligned position.

The method may also involve deploying and/or retrieving the seismic cable. Other steps may also be performed, such as scanning RFID tags on the sensor stations as they pass through the winch assembly, burying of the seismic cable and/or placing the sensor station, disposing the seismic cable about the reel, selectively applying tension to the seismic cable, loading the reel onto the platform, collecting subsurface data from the sensor stations, and/or correlating information from the sensed RFID tags with the subsurface data collected by the sensor stations. The steps may be performed automatically or manually, in any order and repeated as desired.

While the present disclosure describes specific techniques, numerous modifications and variations will become apparent to those skilled in the art after studying the disclosure, including use of equivalent functional and/or structural substitutes for elements described herein. For example, aspects of the subject matter can also be manually or automatically implemented in one or more reels, cable guides, etc.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the subject matter.

The invention claimed is:

1. A system for handling seismic cable having sensor stations thereon, the seismic cable positionable about a seismic field for measuring seismic parameters of a subsurface structure, the system comprising:
   a mobile unit positionable about the seismic field, the mobile unit having a platform;
   a reel supportable on the platform, the seismic cable disposable about the reel; and
   a winch assembly carried by the mobile unit, the winch assembly comprising a plurality of cable guides, at least one of the plurality of cable guides having an adjustable passageway for aligning and guiding the seismic cable and a sensor stations passing therethrough;
   wherein the plurality of cable guides comprise at least one accumulator guide sheave, and the at least one accumulator guide sheave comprises a sheave wheel and a sheave guide each having guide channels thereon for aligning the cable as it passes therebetween, wherein a body of the sensor station passes along the guide channels and wherein the sheave guide is curved and outwardly angled to slidingly receive a spike extending from the body of the sensor station to assist in positioning the sensor station as it passes.

2. The system of claim 1, wherein the at least one accumulator guide sheave comprises an accumulator roller and an accumulator guide.

3. The system of claim 1, wherein the plurality of cable guides comprises at least one tensioner.

4. The system of claim 3, wherein the at least one tensioner comprises a top plate and a pair of movable bottom plates with a pair of rollers therebetween.

5. The system of claim 4, wherein a portion of the passageway is defined between the tension rollers for guiding the cable and a body of the sensor station therethrough, wherein another portion of the passageway is defined between the tension guides for guiding a spike extending from the body of the sensor station, wherein the tension guides each have curved surfaces defining the other portion of the passageway therebetween for passing the spike of the sensor station therethrough.

6. The system of claim 1, wherein the plurality of cable guides comprises at least one static guide.

7. The system of claim 6, wherein the at least one static guide comprises a ring connectable to the mobile unit and positionable adjacent a surface of the seismic field.

8. The system of claim 1, further comprising a radio frequency identification unit on the mobile unit, the radio frequency identification unit comprising an antenna and a radio frequency identification sensor, the radio frequency identification sensor detecting radio frequency identification tags on the sensor stations.

9. The system of claim 1, further comprising a crane carried by the mobile unit.

10. The system of claim 1, further comprising a motor operatively connectable to the reel, the motor rotationally driving the reel.

11. The system of claim 1, wherein the mobile unit comprises a truck.

12. The system of claim 1, wherein the plurality of cable guides comprises at least one cable guide positionable adjacent the surface location.

13. The system of claim 1, further comprising electronics.

14. A method for handling seismic cable about a seismic field, the seismic cable having sensor stations thereon, the method comprising:
   providing a system
   the system comprising: a mobile unit positionable about the seismic field, the mobile unit having a platform; a reel supportable on the platform, the seismic cable disposable about the reel; and a winch assembly carried by the mobile unit, the winch assembly comprising a plurality of cable guides, at least one of the plurality of cable guides having an adjustable passageway for aligning and guiding the seismic cable and a sensor station passing therethrough;
   wherein the plurality of cable guides comprise at least one accumulator guide sheave, and the at least one accumulator guide sheave comprises a sheave wheel and a sheave guide each having guide channels thereon for aligning the cable as it passes therebetween, wherein a body of the sensor station passes along the guide channels and wherein the sheave guide is curved and outwardly angled to slidingly receive a spike extending from the body of the sensor station to assist in positioning the sensor station as it passes;
   positioning the mobile unit about the seismic field;
   supporting the reel on the platform; and
   passing the seismic cable and the sensor stations through the plurality of cable guides in an aligned and guided position.

15. The method of claim 14, further comprising deploying the seismic cable and the sensor stations about the seismic field.

16. The method of claim 14, further comprising retrieving the seismic cable and the sensor stations from the seismic field.

17. The method of claim 14, further comprising disposing the seismic cable about the reel.

18. The method of claim 14, wherein the plurality of cable guides comprises at least one tensioner, and further comprising selectively applying tension to the seismic cable with said at least one tensioner.

19. The method of claim 14, further comprising loading the reel onto the platform.

20. The method of claim 14, further comprising a radio frequency identification unit on the mobile unit and scanning radio frequency identification tags on the sensor stations with said radio frequency identification unit.

21. The method of claim 20, further comprising collecting subsurface data from the sensor stations.

22. The method of claim 21, further comprising correlating information from the sensed radio frequency identification tags with the subsurface data collected by the sensor stations.

23. The method of claim 22, further comprising determining a location of each of the sensor stations from global positioning satellite data.

24. The method of claim 14, further comprising burying the seismic cable and sensor stations in the earth.

* * * * *